(12) United States Patent
Chundi

(10) Patent No.: US 11,034,030 B2
(45) Date of Patent: Jun. 15, 2021

(54) SCISSOR ARM FOR UNMANNED ROBOTIC SYSTEM

(71) Applicant: Venkata Rama Subba Rao Chundi, Cumming, GA (US)

(72) Inventor: Venkata Rama Subba Rao Chundi, Cumming, GA (US)

( * ) Notice: Subject to any disclaimer, the term of this patent is extended or adjusted under 35 U.S.C. 154(b) by 155 days.

(21) Appl. No.: 16/450,415

(22) Filed: Jun. 24, 2019

(65) Prior Publication Data

US 2019/0389080 A1     Dec. 26, 2019

Related U.S. Application Data

(60) Provisional application No. 62/690,011, filed on Jun. 26, 2018.

(51) Int. Cl.
| | |
|---|---|
| B25J 15/06 | (2006.01) |
| B25J 15/02 | (2006.01) |
| B25J 9/12 | (2006.01) |
| B64C 39/02 | (2006.01) |
| B64D 1/00 | (2006.01) |

(52) U.S. Cl.
CPC ........... *B25J 15/0273* (2013.01); *B25J 9/126* (2013.01); *B64C 39/024* (2013.01); *B64D 1/00* (2013.01); *B64C 2201/128* (2013.01)

(58) Field of Classification Search
CPC ........ B25J 1/06; B25J 15/0273; B25J 15/022; B25J 9/1669; B64C 2201/128
USPC ....................................................... 294/119
See application file for complete search history.

(56) References Cited

U.S. PATENT DOCUMENTS

| | | | | |
|---|---|---|---|---|
| 10,796,275 | B1* | 10/2020 | Wilkins | .............. G06T 7/90 |
| 2009/0050750 | A1* | 2/2009 | Goossen | ............ B64C 39/024 |
| | | | | 244/76 R |
| 2018/0335372 | A1* | 11/2018 | Oral | ................ A01G 3/00 |
| 2019/0043370 | A1* | 2/2019 | Mulhall | ............. G08G 5/0013 |
| 2019/0047696 | A1* | 2/2019 | Gwin | ................ B25J 9/1085 |
| 2019/0166765 | A1* | 6/2019 | Maor | ................ G06F 16/587 |
| 2019/0202560 | A1* | 7/2019 | Bosworth | ........... B25J 15/0028 |
| 2019/0276140 | A1* | 9/2019 | Poltorak | ............... B64C 27/08 |
| 2019/0314990 | A1* | 10/2019 | Sugaki | .................. B25J 5/00 |
| 2019/0321971 | A1* | 10/2019 | Bosworth | ............... B25J 9/162 |
| 2020/0148349 | A1* | 5/2020 | Bosworth | ............. G05D 1/101 |

* cited by examiner

*Primary Examiner* — Joshua T Kennedy

(57) ABSTRACT

The present invention recites a scissor arm for an unmanned robotic system such as a UAV, also known as a drone. This arm would typically be installed on the underside of a UAV with hover capability. The arm is designed to simultaneously vertically lower and horizontally extend a payload, permitting a person to interact with the payload without risk of injury by the UAV's propellers. This arm is practical for applications such as a routine police traffic stop, wherein an officer can safely remain in their vehicle and interact with the driver via a drone equipped with communication equipment and such an arm. The drone's arm can present the driver with a box for gathering documents from the driver without risk of injuring the driver or damaging the driver's vehicle. This is accomplished by two inventive "L"-shaped trusses that offset the arm's payload horizontally as the arm is extended downward.

12 Claims, 6 Drawing Sheets

SCISSOR ARM FOR UNMANNED ROBOTIC SYSTEM

This application claims the priority of U.S. Provisional Patent application No. 62/690,011, filed on Jun. 26, 2018. A scissor arm for an unmanned robotic system, and more specifically an unmanned aerial vehicle such as a drone. This invention is adapted to move a payload from one location to another, typically for safely interacting with a human without risk of injury to the human.

BACKGROUND

As unmanned systems become more mainstream, it is important to introduce a safe and reliable method for these systems to physically interact with humans. For example, a drone can do the same functions as a police officer during a routine traffic stop, with the exception that the suspect has to somehow provide their documents to the police officer. If a drone is equipped with the present invention, this task is easily and safely accomplished.

The principle of the scissor arm, pantograph or lazy tong is well-known as early as U.S. Pat. No. 1,340,313, patented in 1920. Transmission of force via a series of trusses, joints and pivots was built as early as 1603 as a device to copy and scale diagrams.

This same principle can be used to lift objects, as seen on U.S. Pat. No. 5,795,004 for HAND HELD DEVICE FOR ELEVATING OBJECTS, moving an animated bird of a cuckoo clock, as seen in U.S. Pat. No. 7,126,882, lifting boxes as seen in U.S. Pat. No. 7,896,415, unfolding a solar array as seen in U.S. Pat. No. 6,423,895, or lifting platforms as seen in U.S. Pat. No. 4,558,648.

There is known U.S. Pat. No. 9,780,435 that uses scissor lift members to elevate robots to scan inventory with an RFID antenna.

The present invention uses the principle of the scissor arm not only to lower a payload, but to also lower and distance the payload away from the center of the top of the scissor arm. The other difference between this invention and the prior art is the fact that while extending, the scissor arm and its payload are helped by gravity, whereas the scissor arm in the prior art acts against gravity as the payload extends.

Object of the Present Invention

The object of the present invention is to manipulate a payload on an aerial unmanned robotic system so that a person can interact with the payload safely and outside the danger area of the system. This is especially necessary when the system is an airborne drone such as a multi-rotor that is hovering while the person interacts with the payload. The payload is located at the end of a scissor arm that is extremely light, has a very long stretch, and involves very little electronic components. Only one small electric motor is necessary to extend and retract the arm, and the motor commands are only to turn in one direction, stop, and turn in the reverse direction.

This invention uses the scissor arm principle to lower and distance the payload horizontally away from the drone so that the person can physically interact with the payload with no risk to exposure to the drone's spinning propellers or other propulsion means.

This invention is not limited to multi-rotors, and can be used on ground-based robotic systems. As long as there is danger to a person from an unmanned robotic system's moving parts, the present invention will mitigate any risk of injury.

The preferred embodiment's arm can extend up to 1 meter vertically and 0.6 meters horizontally. When closed, arm 4 measures 20 cm by 7 cm by 30 cm, and weighs 1.5 kg. It can move up to 4 lb from one place to another. The arm of the preferred embodiment is made of carbon fiber segments, which are not affected by thermal expansion, corrosion, are light-weight, have a high tensile strength, and low thermal conductivity.

DETAILED DESCRIPTION OF THE PREFERRED EMBODIMENT

The present invention's preferred embodiment comprises a scissor arm with a payload that is attached to an unmanned aerial vehicle capable of hover flight, also known as a drone. When folded, the arm is shorter than the drone's landing gear, allowing the drone to land on a flat surface without the arm interfering. When fully extended, the arm not only extends below the drone in the vertical plane, but also extends away from the drone in the horizontal plane.

The preferred embodiment comprises 28 individual trusses that can easily be replaced individually rather than replacing the entire apparatus, thus saving operational costs. The arm can be easily customized for various purposes by either adding or subtracting trusses, or making the trusses longer or shorter.

In order to extend in the horizontal plane, the arm comprises two complimentary L-shaped trusses that distance the payload away from the UAV's hazardous moving parts, and keep the payload oriented horizontally. When fully extended, a person can interact with the payload with no risk of bodily damage from the drone's propulsion system such as propellers.

A high-torque motor provides the required force to elongate the crisscrossed trusses of the arm, and once a person has interacted with the arm's payload, the motor reverses to retract the arm back into its folded configuration.

Figure 1:
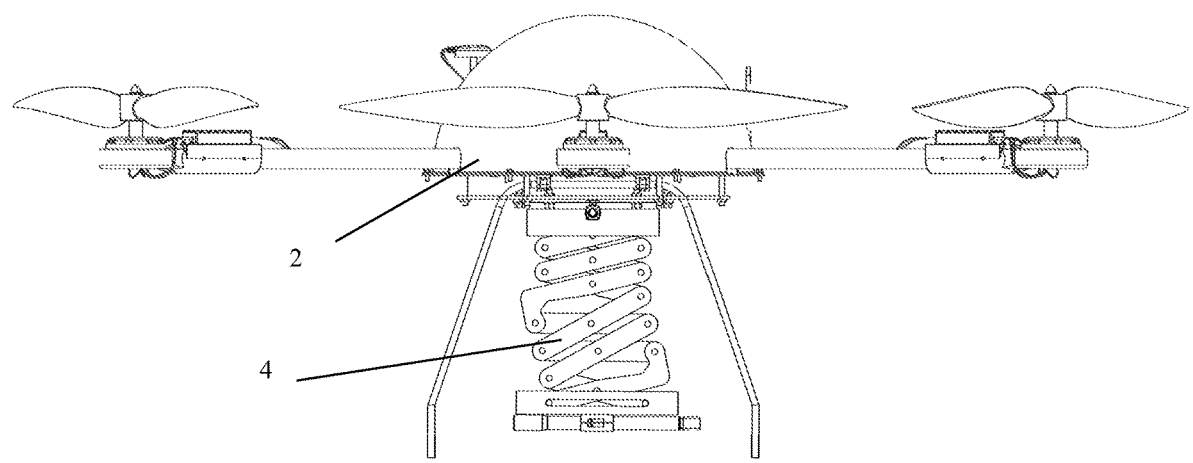
FIG. 1 shows the present invention attached to a multi-rotor drone.

Referring now to figures, FIG. 1 shows a multi-rotor UAV or drone 2 with a depending folded arm 4, which is the object of the present application.

Figure 2:
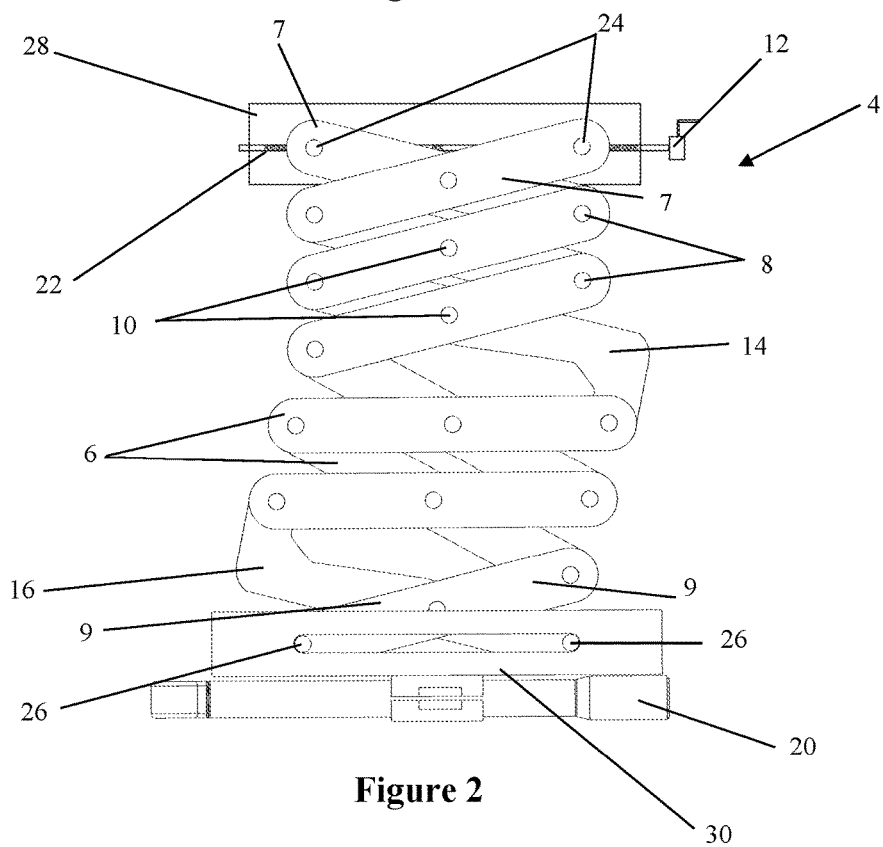
FIG. 2 shows a retracted view of the present invention.

FIG. 2 shows a detailed view of the folded arm 4 with a payload 20 at its extremity. In the preferred embodiment, payload 20 is a box with doors that is used to collect documents from a driver during a routine police traffic stop. Arm 4 of the preferred embodiment comprises twenty-eight trusses 6, the initial trusses 7 are attached to a force input rail 28 via screw shaft followers 24.

Screw shaft followers 24 are threaded onto screw shaft 22, which is turned by motor 12. If motor 12 turns screw shaft 22 in one direction, screw shaft followers 24 slide along force input rail 28, causing initial trusses 7 to move towards each other along force input rail 28. Trusses 6 are pivotally joined to each other at their distal ends by extremity joints 8, and at their centers by center pivots 10. Arm 4 comprises first element or mid-way L-shaped truss 14 and lower L-shaped truss 16 in a mirror image configuration to the horizontal axis to allow the arm to extend horizontally once unfolded.

At arm 4's distal end, located opposite to the force input rail, force output rail 30 comprises truss followers 26 that slide horizontally along force output rail 30, said truss followers 26 being attached to the distal ends of terminal trusses 9. As motor 12 forces screw shaft followers 24 to squeeze initial trusses 7 together, terminal trusses 9 are consequently squeezed together, being attached to truss followers 26 that slide along force output rail 30.

Figure 3:
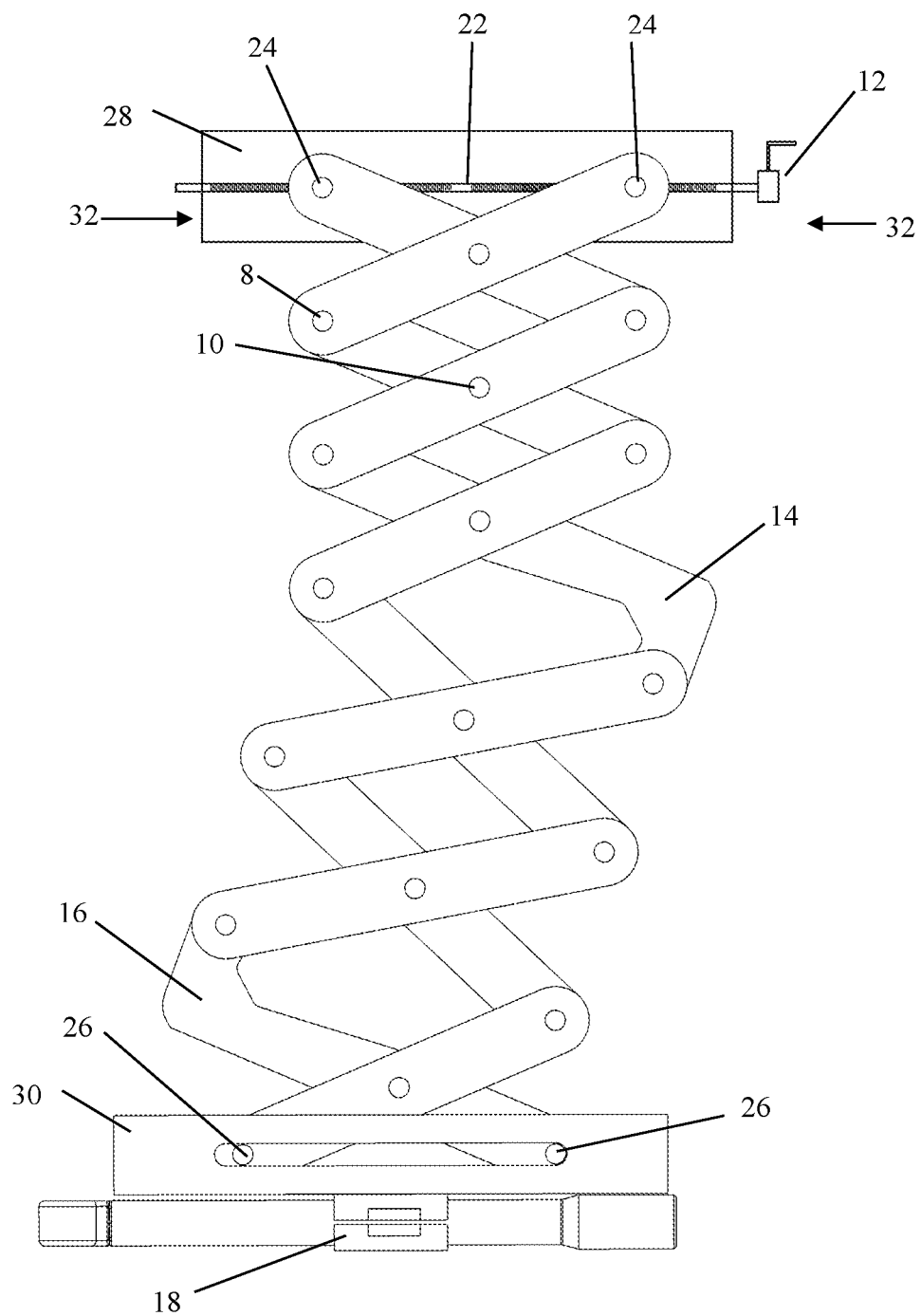
FIG. 3 shows the present invention as it begins its extension

FIG. 3 shows arm 4 starting its extension from a folded position. Motor 12 turns screw 22 causing screw shaft followers 22 to slide inwardly along direction of movement 32, along force input rail 28. The force on initial trusses 7 translates to all trusses 6 via extremity joints 8 and center pivots 10, causing reciprocal movement of trusses 6 and unfolding of arm 4. Mid-way L-shaped truss 14 pushes all trusses 6 that are located below, in one direction, and lower L-shaped truss 16 causes all trusses 6 below to straighten arm 4 so that payload 20 remains horizontal. In FIG. 3, lower L-shaped truss 16 is the same as the terminal truss 9, being the last truss of arm 4. As arm 4 extends, the distal ends of terminal trusses 9 slide along force output rail 30 on rail followers 26.

Figure 4:
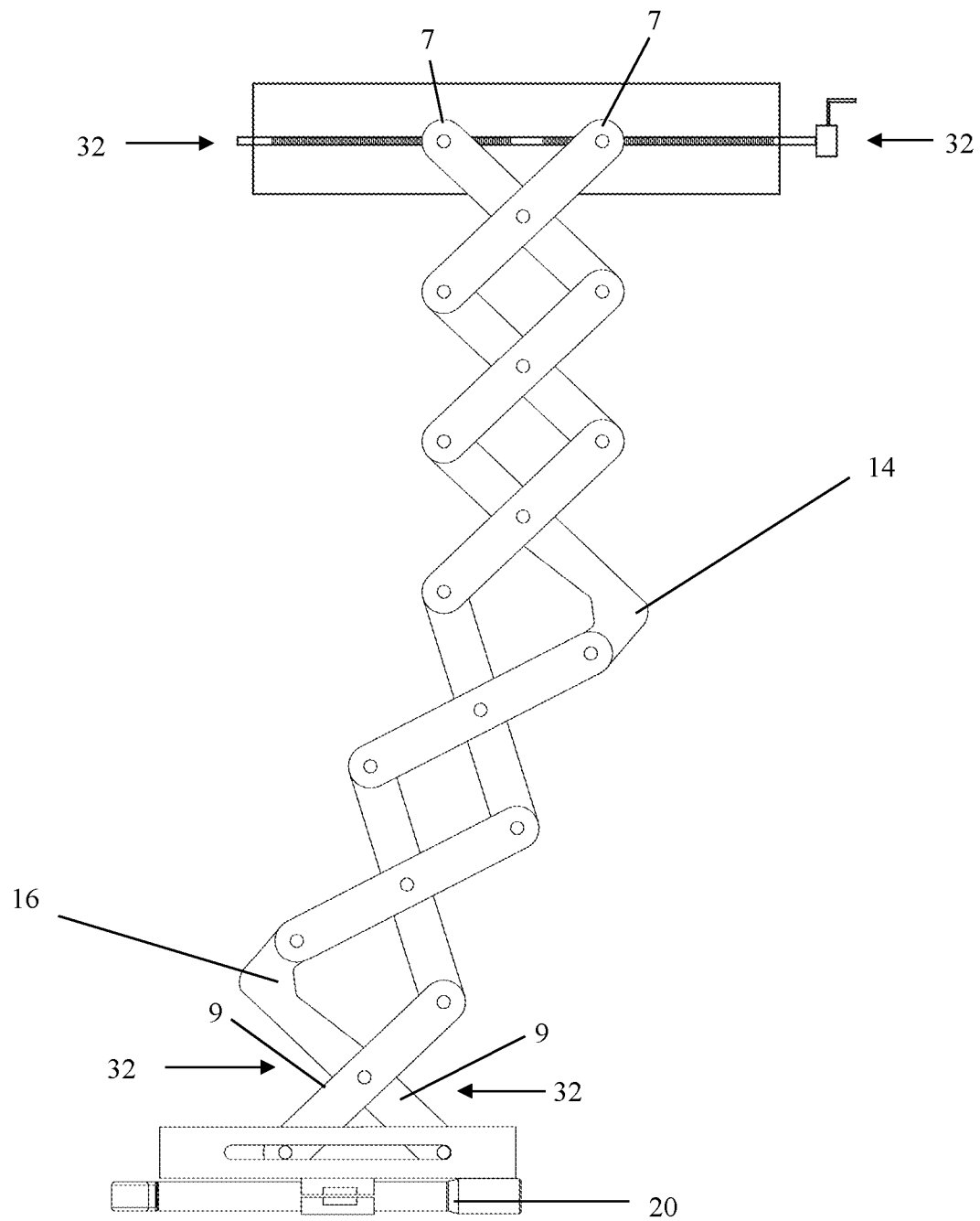
FIG. 4 shows a further view of the present invention's extension.

FIG. 4 shows a nearly-extended arm 4, demonstrating directions of movement 32 of the distal ends of initial trusses 7 and terminal trusses 9. Complimentary mid-way L-shaped truss 14 and lower L-shaped truss 16 enable arm 4 to extend into the horizontal plane, keeping payload 20 horizontal.

Figure 5:
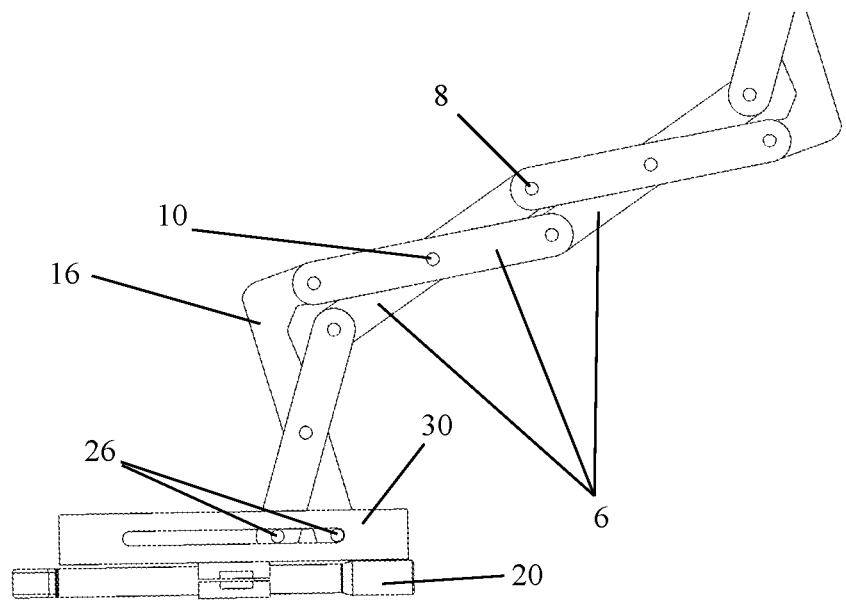
FIG. 5 shows the payload of present invention when fully extended.

FIG. 5 shows the part of arm 4 that interacts with a person when fully extended. Payload 20 is kept horizontal due to mid-way L-shaped truss 14 (not seen on FIG. 5) and lower L-shaped truss 16. Rail followers 26 are substantially touching on force output rail 30.

Figure 6:
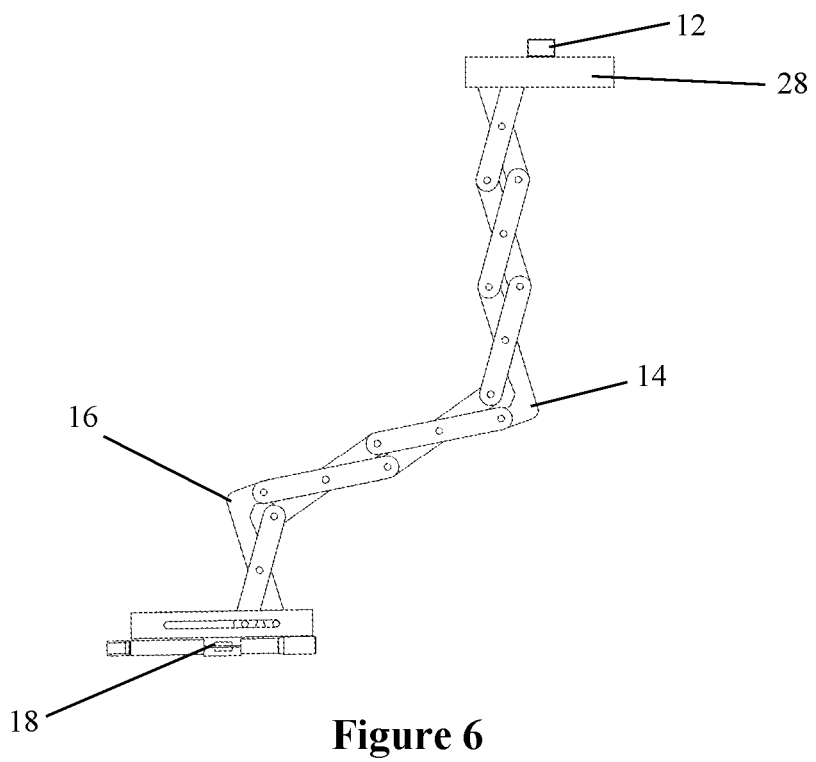

FIG. 6 shows another embodiment of the present invention with a motor 12 located on top of force input rail 28 rather than on the side, and with payload support 18 without a payload 20. This figure shows arm 4 fully extended, with screw shaft followers 24 substantially in contact, and rail followers 26 substantially in contact.

Figure 7:
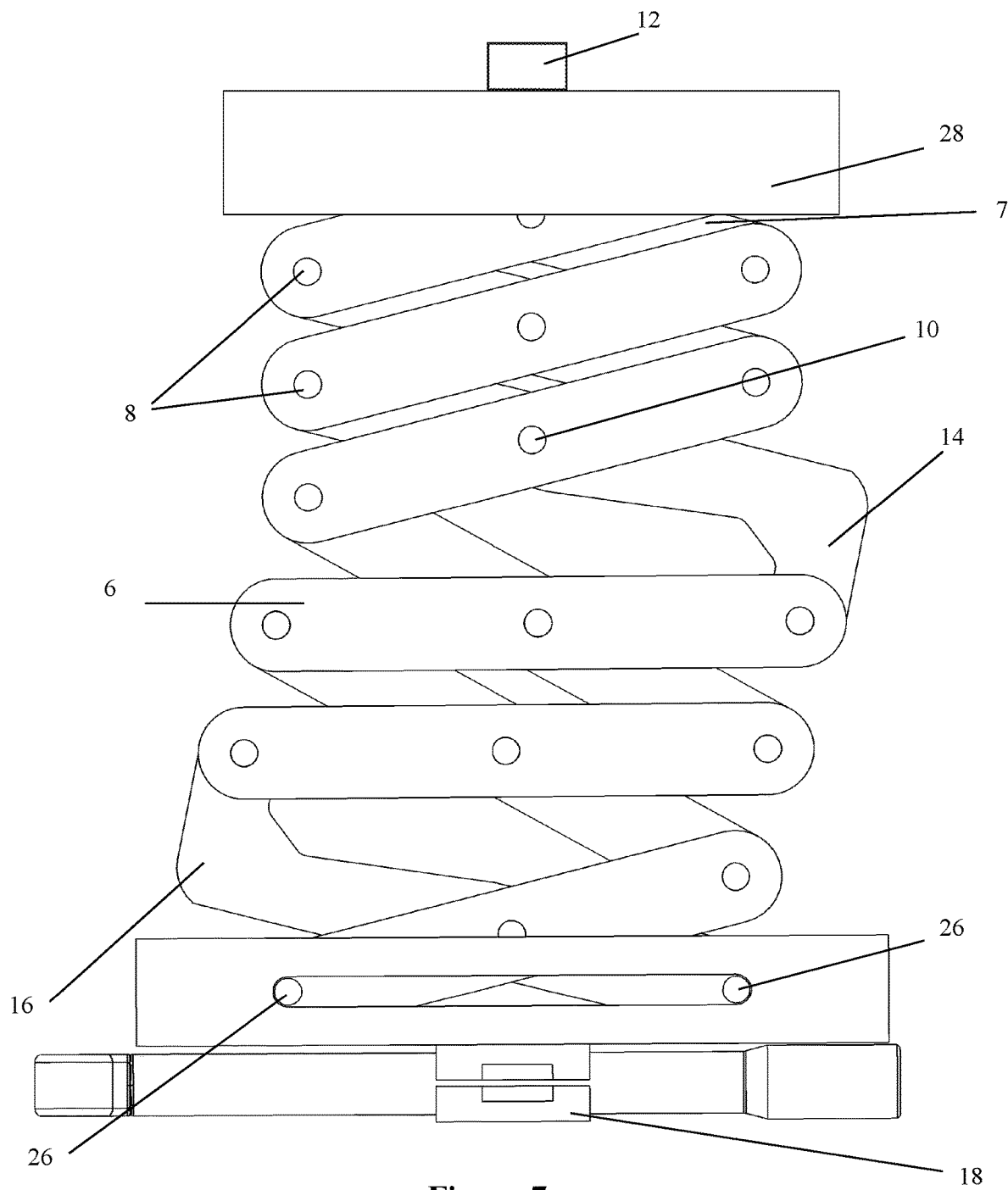
FIG. 7 shows another embodiment of the present invention with a different motor placement.
Figure 8:
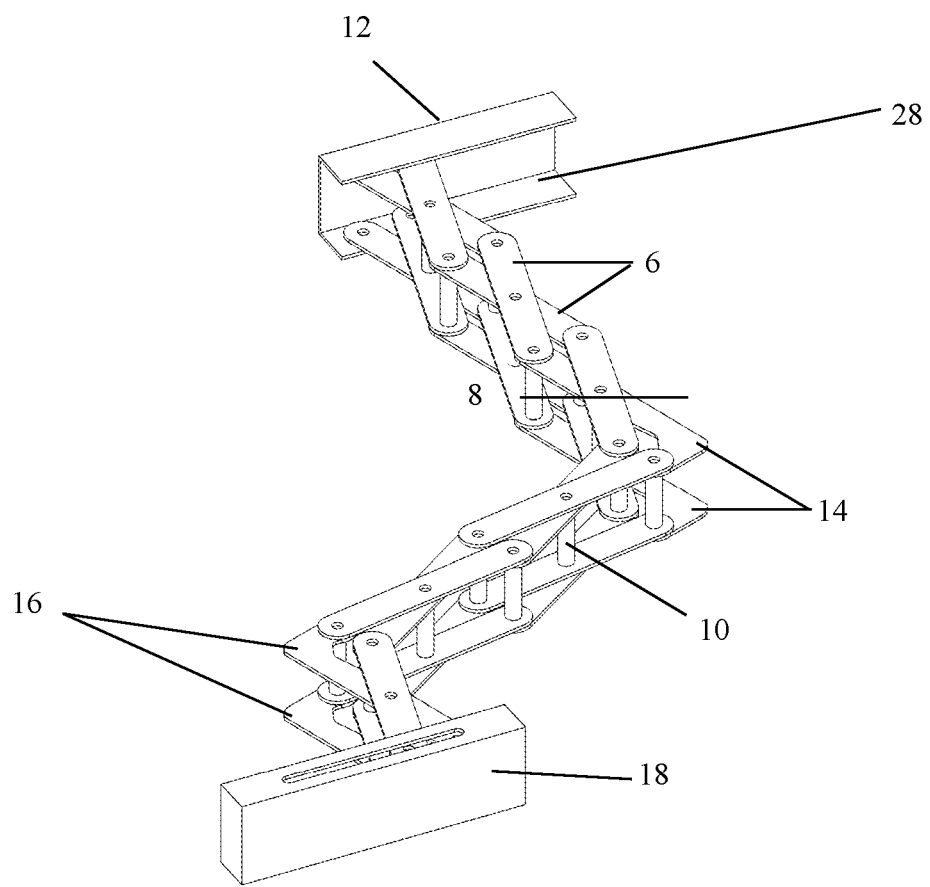
FIG. 8 is a lower perspective view of FIG. 6.

FIG. 7 shows a folded view of FIG. 6. In this embodiment, arm 4 is made out of light-weight carbon fiber material. FIG. 8 shows a lower perspective view of FIG. 6, demonstrating configuration of truss extremity joints 8 and center pivots 10.

Although the present invention can be used with many various applications, the described preferred embodiment is designed for use with a law enforcement drone that is mounted on top of a police vehicle to interact with drivers of vehicles during routine traffic stops.

In operation, once a police vehicle stops a suspect vehicle for a routine traffic stop, drone 2 takes off from the roof of a police vehicle with arm 4 in a folded position. If the police officer determines that the driver needs to provide documents such as a license and registration, drone 2 hovers near the driver's side window and actuates motor 12 to turn screw shaft 22. Once screw shaft 22 starts to turn, screw shaft followers 24 begin moving horizontally on force input rail 28 along direction 32, in turn pulling distal ends of initial trusses 7 towards each other. The inward movement of trusses 7 causes all trusses 6 to rotate about truss center pivots 10 and to pivot at extremity joints 8.

The distal ends of terminal trusses 9 approach each other, sliding along force output rail 30 on rail followers 26. Due to the configuration of mid-way L-shaped truss 14 and lower L-shaped truss 16, arm 4 extends both vertically and horizontally as it unfolds. When arm 4 is fully extended, driver of the suspect vehicle can safely interact with payload 20, in the form of a box, attached to payload support 18. Drone 4 then transports all documents to the police officer, who verifies their authenticity and issues a contravention, if necessary. Police officer returns all documents and contravention into box 20, and drone 2 flies to suspect vehicle to return all contents of box 20 to driver.

Once all procedures are complete, arm 4 returns to its folded position by reversing motor 12, and drone 2 can safely land back on its docking station on top of police vehicle.

The preferred embodiment's arm 4 can extend up to 1 meter vertically and 0.6 meters horizontally. When closed, arm 4 measures 20 cm by 7 cm by 30 cm, and weighs 1.5 kg. It can support up to 2 kg at full extension. Arm 4 is made of carbon fiber segments, which are not affected by thermal expansion, corrosion, are light-weight, have a high tensile strength, and low thermal conductivity.

The motor 12 can be a very simple and inexpensive motor that has to be capable of turning in one direction, stopping, and turning in the opposite direction. This minimalist approach makes arm 4 of the present invention very advantageous due to its simplicity and ease of maintenance.

Although the preferred embodiment as described is for a multi-rotor drone, the present invention can be easily adapted to ground vehicles or stationary platforms as well.

The invention claimed is:

1. A scissor arm for an unmanned aerial robotic system provided to move a payload comprising:
    a scissor arm with a proximal and distal portion, said proximal portion being attached to a scissor arm activating system, and said distal end comprising a payload,
    said scissor arm is manipulated by said activating system, said activating system being adapted to extend said arm into an operable position, and to retract said arm in a reverse direction to bring it into an inoperable position,
    said scissor arm is adapted to vertically lower and horizontally distance said payload away from said unmanned aerial robotic system so that a person can physically interact with said payload without risk of injury from robotic system's moving parts,
    said scissor arm comprises an upper portion and a lower portion, each of said portions comprising a plurality of individual trusses, each plurality comprising at least four trusses, said upper portion providing movement in a vertical plane, and said lower portion providing movement in a horizontal plane, wherein a first element located between said upper and lower portions is adapted to extend said lower portion of said trusses horizontally, and a second element adjacent to said payload that maintains a horizontal orientation of said payload during operation,
    wherein initial trusses of said scissor arm's upper portion's plurality of individual trusses are connected to said activating system, and terminal trusses of said lower portion's plurality of individual trusses are connected to rail followers.

2. A scissor arm for an unmanned aerial robotic system according to claim 1, wherein in said inoperable position, said scissor arm is configured to be shorter than landing gear of an unmanned aerial robotic system to allow said unmanned aerial robotic system, equipped with said scissor arm, to land on a surface without interference with said arm, wherein said unmanned aerial robotic system is a drone.

3. A scissor arm for an unmanned aerial robotic system according to claim 1, wherein said activating system is an electric motor connected to a force input rail provided with an upper screw shaft and upper screw shaft followers adapted to extend and retract said scissor arm from said operable position into said inoperable position.

4. A scissor arm for an unmanned aerial robotic system according to claim 3, wherein said initial trusses of said upper portion of said arm are connected to said upper screw shaft followers on said a force input rail, wherein said motor turns said screw shaft in one direction and said screw shaft followers slide along said force input rail causing said initial trusses to move towards each other along said force input rail.

5. A scissor arm for an unmanned aerial robotic system according to claim 1, wherein said first element is an upper L-shaped truss adapted to move said arm horizontally, and said second element is a lower L-shaped truss adapted to move said arm vertically.

6. A scissor arm for an unmanned aerial robotic system according to claim 5, wherein said upper L-shaped truss and said lower L-shaped truss enable said arm to move in the horizontal plane, keeping said payload horizontal as said arm is activated from said inoperable to said operable position.

7. A scissor arm for an unmanned aerial robotic system according to claim 5, wherein said upper L-shaped truss pushes all trusses that are located below said upper L-shaped truss in a horizontal direction, and said lower L-shaped truss causes all trusses below said lower L-shaped truss to straighten arm in a downward direction, so that said payload remains horizontal.

8. A scissor arm for an unmanned aerial robotic system according to claim 1, wherein said payload is a box with doors that is used to collect documents from a driver during a routine traffic stop.

9. A scissor arm for an unmanned aerial robotic system according to claim 1, wherein said lower portion or distal end of said arm is provided with said terminal trusses that are attached to said rail followers at the distal ends of said terminal trusses, wherein said rail followers are adapted to slide horizontally along a force output rail.

10. A scissor arm for an unmanned aerial robotic system according to claim 1, wherein a force exerted by said activating system on said initial trusses is translated to said pluralities of individual trusses via extremity joints and center pivots, causing reciprocal movement of said pluralities of individual trusses and unfolding of said arm.

11. A scissor arm configured to be mounted to an unmanned aerial robotic system or drone provided to move a payload, said scissor arm comprising:
  a plurality of individual trusses;
  a proximal and distal portion, said proximal portion being attached to a scissor arm activating system and said distal end comprising a payload;
  said scissor arm being manipulated by a motor, said proximal portion of said arm is connected to a force input rail provided with an upper screw shaft and upper screw shaft followers, wherein said motor turns said screw shaft in one direction and said screw shaft followers slide along said force input rail causing trusses of said plurality of individual trusses adjacent said proximal portion and connected to said force input rail to move towards each other along said force input rail such that said motor extends said arm into an operable position, and said motor retracts said arm in a reverse direction to bring it into an operable position, said plurality of trusses further comprising a first one piece L-shaped truss located substantially at a mid-way point of said scissor arm and configured to extend all trusses below said first L-shaped truss in a horizontal direction, and a second one piece L-shaped truss configured to maintain said payload horizontally oriented such said scissor arm is adapted to vertically lower and horizontally distance said payload away from said unmanned aerial robotic system so that a person can physically interact with said payload without risk of injury from robotic system's moving parts.

12. A scissor arm configured according to claim 11, wherein said payload is a box with doors that is used to collect documents from a driver during a routine traffic stop.

* * * * *